United States Patent [19]

Rudolph, deceased

[11] 4,452,093

[45] Jun. 5, 1984

[54] DRIVE UNIT

[76] Inventor: Rome R. Rudolph, deceased, late of Gibsonia, Pa. by Kathleen Rudolph, executrix, 4113 Lee Rd., Gibsonia, Pa. 15044

[21] Appl. No.: 298,932

[22] Filed: Sep. 3, 1981

[51] Int. Cl.³ .......................................... F16H 27/04
[52] U.S. Cl. ................... 74/84 R; 74/785; 74/436; 74/394
[58] Field of Search ................ 74/785, 750 R, 803, 74/436, 796, 84 R, 393, 394; 192/55, 56 R

[56] References Cited

U.S. PATENT DOCUMENTS

| | | | |
|---|---|---|---|
| 2,986,949 | 6/1961 | Lancaster et al. | 74/567 |
| 3,379,034 | 4/1968 | Gustafson | 192/56 R |
| 3,546,897 | 12/1970 | Kenny | 192/56 R |
| 3,563,101 | 2/1971 | Kinnicutt | 74/84 |
| 3,820,411 | 6/1974 | Rudolph | 74/394 |
| 3,848,472 | 11/1974 | Pim | 74/52 |
| 3,893,553 | 7/1975 | Hansen | 192/56 R |

OTHER PUBLICATIONS

*Mechanism for Intermittent Motion*; New York, New York; Industrial Press, Inc. 1972; pp. 139–151; John H. Bickford.

Primary Examiner—Allan D. Herrmann
Assistant Examiner—Joseph M. Rolnicki
Attorney, Agent, or Firm—Thomas H. Murray; Clifford A. Poff

[57] ABSTRACT

A positive planetary drive having zero backlash interconnects coaxial input and output shafts in a drive unit. A plurality of rollers orbiting about the input shaft is always entrapped in rolling contact with a plurality of wedges supported by the output shaft. Cams in the drive unit provide cam surfaces contacted by orbiting rollers on the input shaft to provide a continuous constant velocity output motion at a speed which is less than the input motion. Intermittent motion is provided by cam surfaces engaged by the same rollers which contact the wedges. A gear drive engaged with a cam plate used to form the various cams provides a variable angular relationship between the input shaft and the output shaft. Protection against a torque overload at the output shaft is provided by permitting plungers to rotate with the cam plate when disengaged from seats supported by the housing.

14 Claims, 8 Drawing Figures

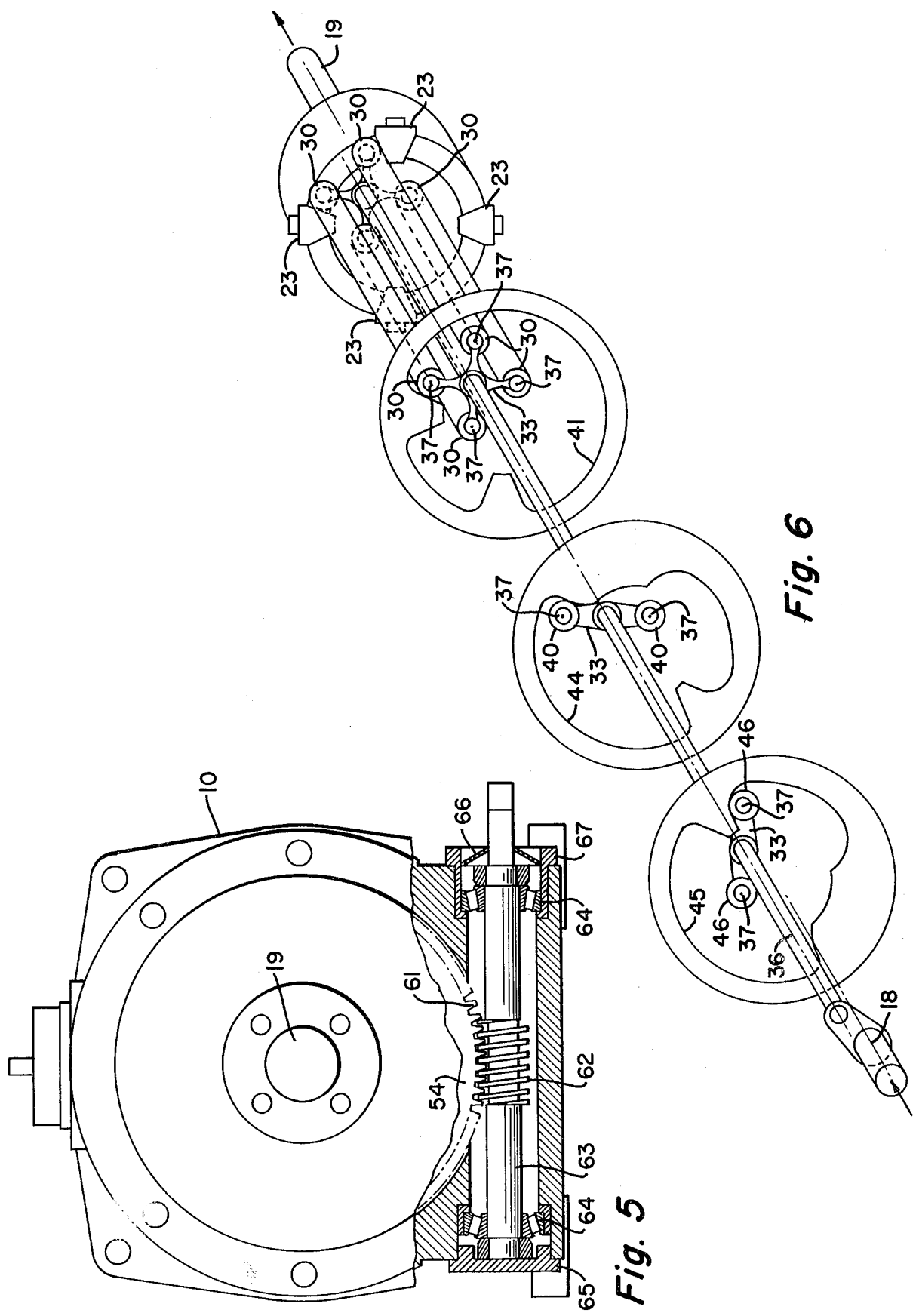

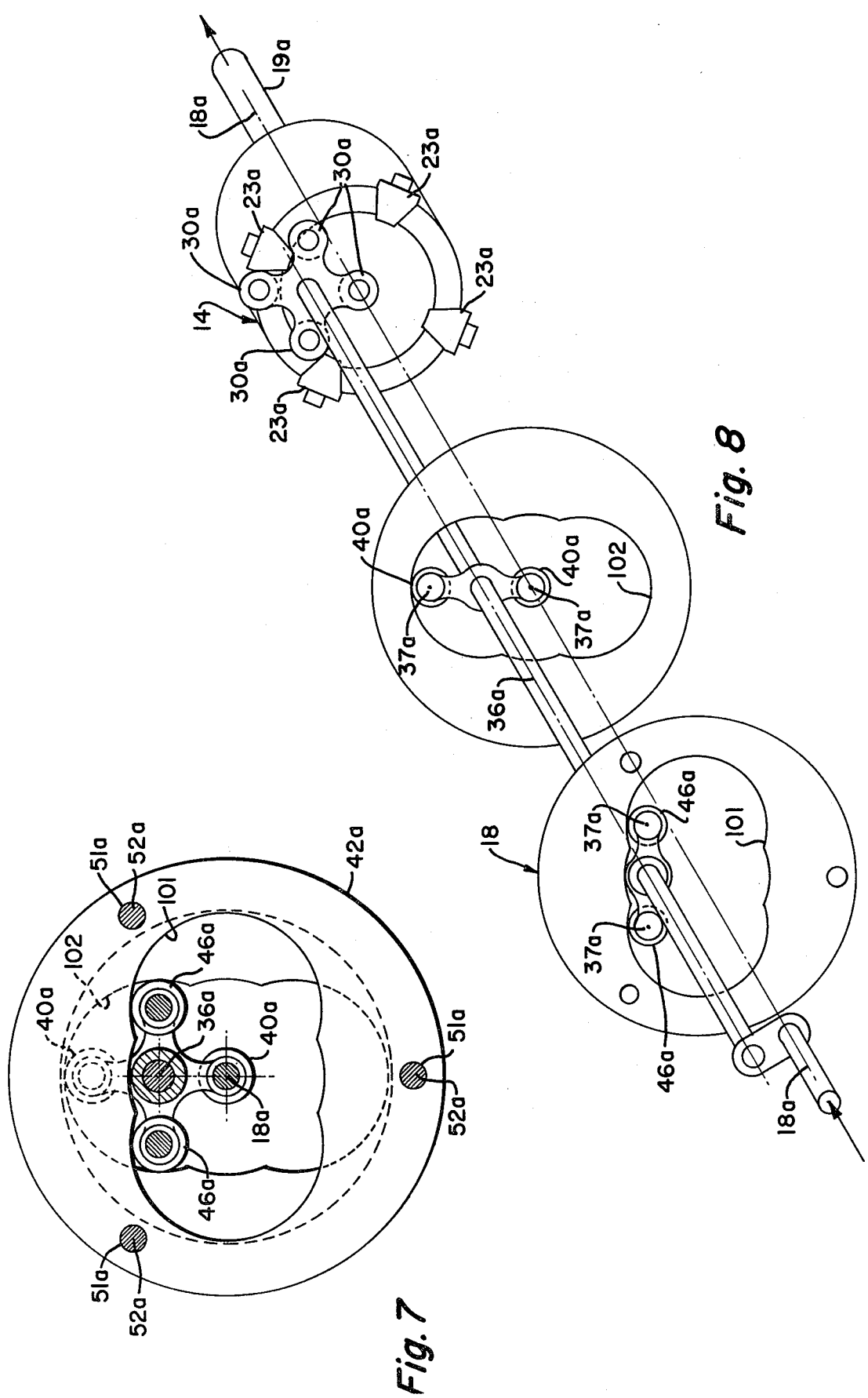

DRIVE UNIT

BACKGROUND OF THE INVENTION

This invention relates to a drive unit having coaxial input and output shafts connected by a positive planetary drive having zero backlash and including tapered wedges for rolling contact with roller members orbiting about the input shaft such that a plurality of the rollers is entrapped in rolling contact with a plurality of the wedges. A further aspect of the present invention relates to such a drive unit additionally embodying a construction of parts to provide a continuous constant velocity output motion at a speed which is less than the input motion and/or intermittent indexing motion, a variable angular relationship between the input shaft and the output shaft and protection against torque overload at the output shaft.

Indexing units have a wide variety of uses in practically all modern industries. Indexing units include an input shaft which is driven continuously at a constant angular velocity; and an output shaft which rotates intermittently. In prior art indexing units, each revolution of the input shaft consists of a "dwell period" during which the output shaft remains stationary; and an "indexing period" during which the output shaft rotates through a selected "indexing angle". Two basic types of mechanisms have been employed to convert the constant rotation of the input shaft into intermittent rotation of the output shaft.

The first mechanism type is the positive drive arrangement wherein, for example, the input shaft carries a cam wheel provided with one or more cam surfaces, and the output shaft, arranged at right angles to the input shaft, carries a second wheel provided with one or more cam followers or rollers.

Other positive drive arrangements are known wherein the input and output shafts are spaced apart and parallel. These positive drive arrangements are modifications of the first-described type and incorporate, for example, a star wheel in place of the cam wheel. See, for example, U.S. Pat. No. 2,986,949. Still other more complicated positive drive arrangements are known for spaced-apart, parallel shafts, which incorporate numerous components in a variety of complex arrangements.

Still another positive drive arrangement, known as the planetary gear mechanisms, incorporates individual rotatable, coaxially-aligned input and output shafts, and non-circular output and planetary gears to produce intermittent output from a single continuous input. See John H. Bickford, "Mechanisms for Intermittent Motion", (New York, New York; Industrial Press, Inc., 1972), page 145. In this arrangement, the output shaft rotates in a direction opposite to that of the input shaft. Moreover, the use of non-circular gears seriously restrict the choice of dwell period and indexing angle.

The second mechanism type may be termed an auxiliary drive arrangement which incorporates electromagnetic clutches and brake mechanisms to effect indexing. In one such arrangement, the input and output shafts are concentrically arranged, i.e., the output shaft extends through a central bore provided in the input shaft. The input shaft is driven continuously. An electromagnetic clutch, when activated, rotates the output shaft. A solenoid-operated brake, when activated, stops the rotation of the output shaft. The second mechanism type requires two power sources, one for driving the input shaft and one for actuating the clutch and brake mechanisms.

In my U.S. Pat. No. 3,820,411, there is disclosed an in-line, positive drive, indexing unit which includes input and output shafts supported in coaxial alignment in a housing for individual rotation about a common axis. A positive drive train includes a planetary gear supported on the input shaft for rotation about a second axis spaced from the common first axis for: (a) rotation about the second axis spaced from the common first axis, and (b) for revolution with the input shaft about the common first axis. An output gear is secured to the output shaft in meshing relation with the planetary gear. The indexer and dwell include cam tracks secured to the housing for controlling rotation of the planetary gear at a distance from the rotational axis of the planetary gear. The planetary gear meshes with a sun gear segment during a first selected arc segment of revolution of the input shaf during which the output shaft remains stationary. The output shaft rotates or indexes through a second selected arc segment of revolution by the input shaft during which the planetary gear of the output drive does not rotate but drives the output gear by its orbital movement. The use of an arcuate slot as part of the cam track to receive a roller that moves radially into and out of the slots requires an operating clearance which permits a certain amount of unwanted motion between the parts, usually referred to as backlash. However, it is imperative with a roller system of this type that the rollers freely enter and exit from the slots and that the rollers rotate freely during movement along the slot. Thus, the width of the slot must be larger than the diameter of the rollers so that when in rolling contact with one side of the slot, the rollers' rotation is not impeded by surface contact with the opposite side of the slot. Backlash occurs due to the clearance resulting from the difference between the roller diameter and the width of the slot.

SUMMARY OF THE INVENTION

It is an object of the present invention to provide a drive unit and improvements to an indexing unit of the type shown in my prior U.S. Pat. No. 3,820,411 to achieve zero backlash in the drive train between input and output shafts of the unit.

It is a further object of the present invention to provide an arrangement of a series of rollers and a series of tapered wedges in a drive train between input and output shafts of a drive unit wherein a plurality of rollers is entrapped in moving contact with a plurality of wedges during orbital movement of the rollers about a common axis of rotation by input and output shafts.

It is a further object of the present invention to provide a drive unit having a continuous constant velocity output motion as well as an intermittent indexing motion.

It is still another object of the present invention to provide an improved indexing unit in which the angular relationship of an output shaft can be easily changed with respect to an input shaft.

It is still another object of the present invention to provide an improved indexing unit embodying a construction and relationship of parts to protect an output shaft against a torque overload.

More particularly, according to the present invention there is provided a drive unit including coaxially-aligned input and output shafts supported for individual rotation about a common first axis, and a positive drive train having zero backlash for connecting the input shaft to the output shaft, the positive drive train including planetary means for revolving about the common first axis while supported for rotation about a second axis, the planetary means includes a plurality of roller members carried by supports extending radially from the second axis for rotating about one of a plurality of third axes equally spaced from the second axis, and an array of spaced-apart wedges secured for rotating the output shaft, each wedge having tapered side surfaces for rolling contact with the roller members, the wedges being radially situated from the common first axis and spaced from one another to always entrap a plurality of the rollers with a plurality of the wedges while in rolling contact therewith.

In the preferred form, the drive unit further includes dwell means operable during a first selected arc segment of revolution of the input shaft for rendering the positive drive train inactive whereby the output shaft remains stationary, and indexing means operable during a second selected arc segment of revolution of the input shaft for activating the positive drive train to rotate the output shaft through a selected indexing angle in the same direction of rotation as the input shaft. When desired, the positive drive train includes means for limiting the delivery of torque to the output shaft. Such means includes drive pins held under a spring force in drive seats until a torque overload occurs whereupon the pins move from the seats. The drive unit preferably further includes means to adjust the phase angle relation between the output and input shafts. Such means includes constructing the housing of the drive unit to support one of two meshing gears. The other of the gears being secured to displace at least the aforementioned roller members on an input shaft for adjusting the phase relation relative to the output shaft.

These features and advantages of the present invention as well as others will be more fully understood when the following description is read in light of the accompanying drawings, in which:

FIG. 5 is a sectional view taken along line V—V of FIG. 1;

FIG. 6 is an isometric view schematically illustrating the positive drive train, dwell cam means and indexing cam means of the intermittent drive unit of the present invention;

FIG. 7 is a sectional view similar to FIG. 4 but illustrating cam drives for providing a constant velocity output for the drive unit according to a further embodiment of the present invention; and FIG. 8 is an isometric view similar to FIG. 6 but schematically illustrating the positive drive train and cam drives for the constant velocity embodiment of the present invention.

Figure 1:
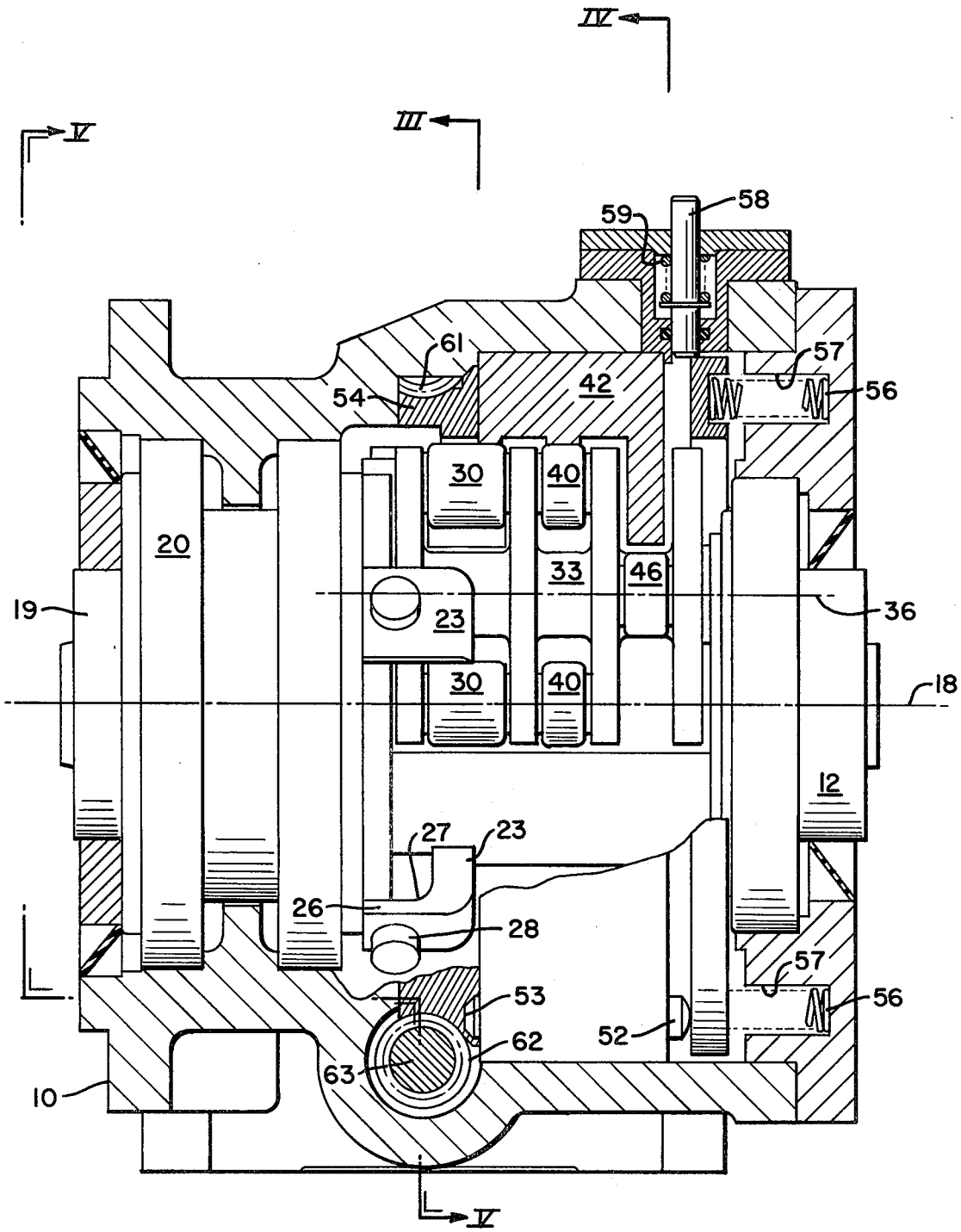
FIG. 1 is an elevational view of the drive unit of the present invention in which a housing of the unit is broken away for clarity.
Figure 2:
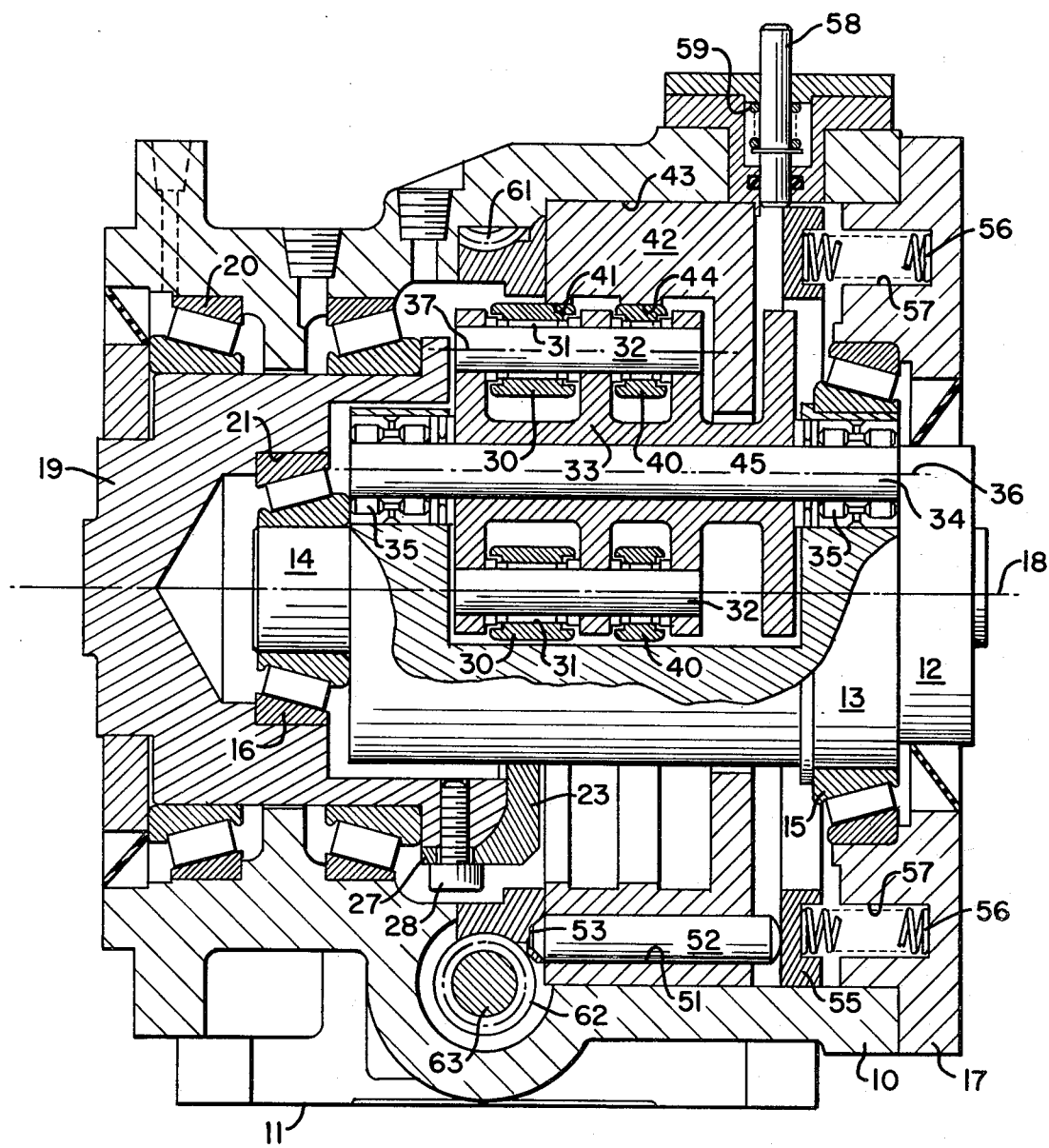
FIG. 2 is an elevational view, in section, of the indexing unit shown in FIG. 1.

The drive unit of the present invention, in its preferred form, is shown in FIGS. 1 and 2 and includes a housing 10 having a base 11 for attachment to a suitable support by threaded fasteners or the like. An input shaft 12 has an end portion extending from the housing for connection to a motor or other drive means, not shown. The input shaft has spaced-apart journals 13 and 14 rotatably supported by a bearing 15 and 16, respectively. Bearing 15 is mounted in an end cap 17 that is attached by bolts to the housing 10. Reference numeral 18 identifies the axis of rotation of the input shaft 12 which is a common first axis of rotation that coincides with the rotational axis of an output shaft 19. Output shaft 19 has an end portion connected to drive a machine element, not shown. Spaced-apart bearings 20 are mounted on the output shaft and supported in the housing 10. The output shaft 19 has a hollow pocket formed in the end portion of the shaft which is located within the housing. In this pocket, there is a surface 21 which supports the bearing 16 for the input shaft.

Figure 3:
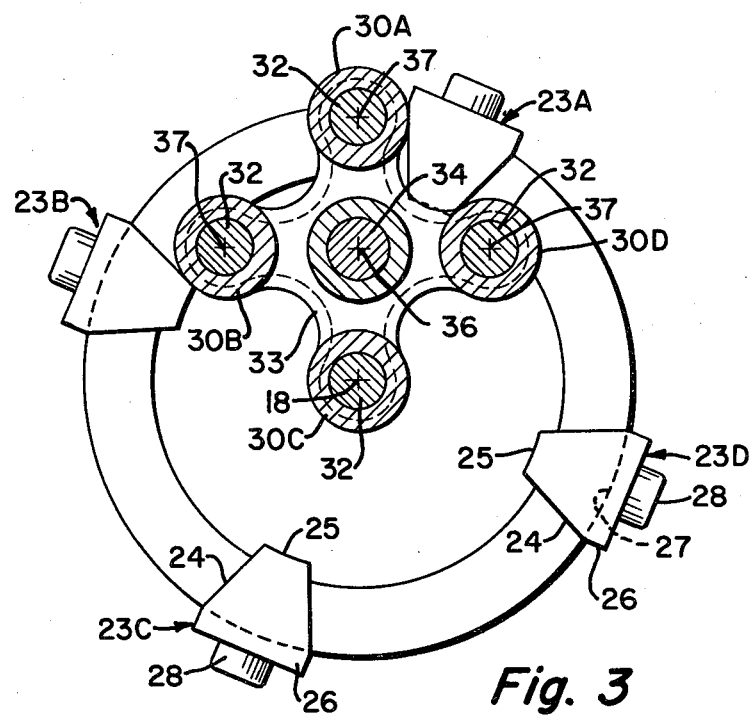
FIG. 3 is a sectional view taken along line III—III of FIG. 1.

As shown in FIGS. 1-3, the end portion of the output shaft 19 located within the housing carries an array of equally-spaced tapered wedge members 23. Each of the tapered wedge members has a keystone-shaped configuration with diverging side edges 24 extending from an arcuate face 25 to a leg section 26 having a curved support surface 27 for engagement with the end portion of output shaft 19. Each wedge member is secured to the output shaft by a threaded fastener 28. The wedges are radially situated from axis 18 by equal distances and peripherally spaced at uniform distances from one another to always entrap a plurality of rollers 30 with a plurality of the wedges while in rolling contact therewith. The rollers 30, there being four rollers shown in FIG. 3, are each rotatably supported by a bearing 31 on an arbor 32. The arbors 32 are supported at the outer end portions of spoke-shaped arms forming part of a carrier or planet wheel 33 having a hub section by which it is mounted on a shaft 34 that is, in turn, carried by bearings 35 for rotation of the planet wheel about a second axis 36. Axis 36 is spaced from and parallel to axis 18. Each of the arbors 32 forms a third axis 37 about which rollers 30 rotate. The axis 36 orbits about axis 18 when the input shaft 12 rotates in the housing. Because at least two adjacent rollers 30 are always in rolling contact with the tapered surfaces of the wedges, there is always a positive drive connection with zero play or backlash between the rollers and the wedges.

To explain the operation of the rollers and wedges shown in FIG. 3, the four rollers are identified by reference numerals 30A, 30B, 30C and 30D and the four wedges are identified by reference numerals 23A, 23B, 23C and 23D. In the position of the parts shown in FIG. 3, roller 30A contacts a tapered wedge surface of wedge 23A while, at the same time, roller 30B contacts a tapered wedge surface of wedge 23B and roller 30D contacts a tapered wedge surface of wedge 23A. Arbors 32 orbit about axis 36 whereby roller 30B advances radially outward along a surface of wedge 23B while roller 30A advances inwardly along the wedge surface of wedge 23A. As roller 30A approaches the curved surface 25 of wedge 23A, roller 30C approaches for contact with the remaining wedge surface of wedge 23B and at the same time, roller 30D moves for later contact with a wedge surface of wedge 23C. Rollers 30B and 30C move into contact with the wedge 23B before roller 30A separates from contact with wedge 23A. In this way, the rollers move in an orbital path with at least two of the rollers always entrapped with at least two wedge surfaces.

Figure 4:
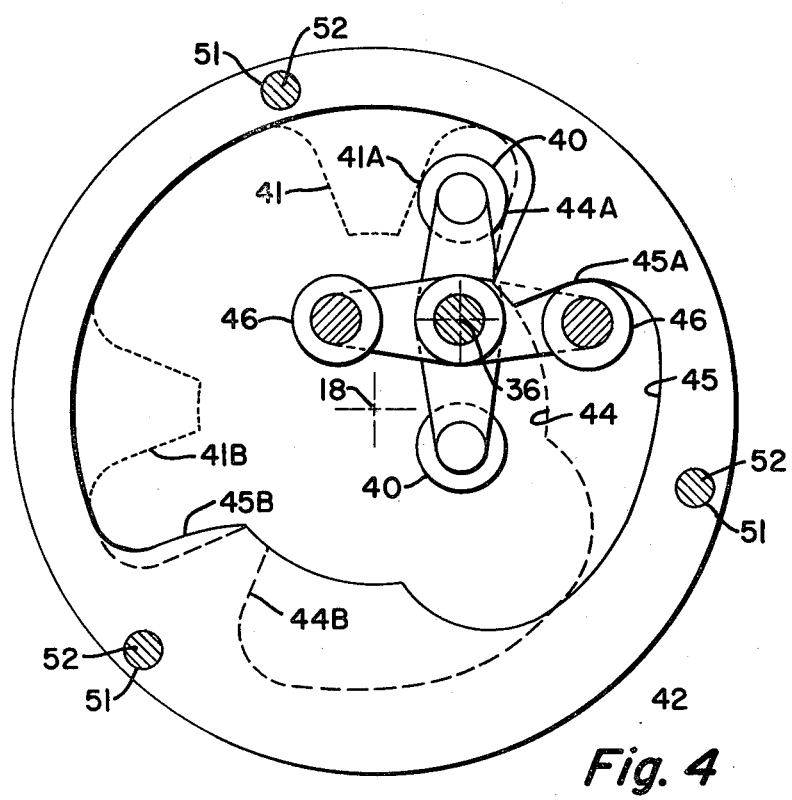
FIG. 4 is a sectional view taken along line IV—IV of FIG. 1.

The rollers 30, as shown in FIGS. 1, 2 and 6, have a relatively broad face as compared with the face width of other rollers 40 which are also mounted on arbor shafts 32 by bearings. The broad faces of rollers 30 permit simultaneous contact by these rollers with the wedges as described above and with an internal cam surface 41 for controlling a dwell period when there is no rotation by the output shaft while the input shaft continuously rotates. Cam surface 41 is developed on a cam plate 42 which is supported in an annular recess 43 formed in the housing 10. In FIG. 4, cam surface 41 is denoted by the dotted line and defines a dwell. In other words, the output shaft is stationary during that part of input shaft rotation when the rollers 30 are rolling on surface 41. The output shaft is rotated or indexed during the remaining part of input shaft revolution. The output shaft rotates by reason of the fact that the rollers 40 and 46 are constrained in their rotation about axis 36 by conjugate cam surfaces 44 and 45 as they move from points 44A and 45A to points 44B and 45B, respectively. From point 41B on the cam surface, the rollers rotate about the axis 36 whereby the output shaft is in a dwell period and remains stationary during that part of input shaft rotation. The amount or degrees of rotation that the output shaft indexes or dwells is determined by selection of cam surfaces for cam plate 42. FIG. 4 defines a four-stop 180°. In other words, the output shaft rotates 90° during 180° of input rotation and remains stationary for the remaining 180°. It is to be understood that the profiles of the cam surfaces on cam plate 42 can be generated in a manner to produce a different indexing period of output motion and a dwell period during which the output shaft remains stationary while the input shaft rotates.

Cam plate 42 preferably further includes two spaced-apart conjugate cam surfaces 44 and 45. Rollers 40 on arbor shaft 32 engage with cam surface 44 while other rollers 46 are mounted by bearings on arbor shafts to the carrier 33. There are two rollers 46 which can engage with cam surface 45 and two rollers 40 which can engage with cam surface 44. The conjugate cam surfaces are developed to provide a speed-controlling function in the drive unit of the present invention.

As shown in FIG. 4, the rollers 40 and 46 take the form of followers that move about the conjugate cam surfaces and in so doing, the rollers orbit about axis 36 at the same time of orbital movement of the carrier about axis 18. The amount of motion translated by the conjugate cam surfaces into carrier rotation about axis 36 during orbital movement of the carrier about axis 18 brings about either rotation or dwell of the output shaft by reason of contact between rollers 30 and the wedges. On the other hand, the conjugate cams translate a designed amount of input rotation into orbital motion of the rollers about axis 36 which is transferred through the wedges as output rotation. This is a speed-controlling function by the drive unit and the amount of reduction between the input shaft and the output shaft can be preselected according to the configuration of the conjugate cam surfaces.

In another aspect of the present invention, the drive unit in its preferred form includes an arrangement of parts to restrict the maximum torque which can be transmitted by the input shaft to the output shaft. For this purpose, in the rim section of cam plate 42, as shown in FIG. 4, there is provided a plurality of plunger sockets 51 in the form of parallel bored openings dispersed at different radii from axis 18 when single position is required or necessary. Otherwise the bores can be at the same radii. Plungers 52 are arranged for longitudinal sliding movement in the plunger sockets 51 such that the conical end portions of the plungers engage in conical end faces or seats 53. Typically, three plungers are used, although two plungers can be used or more than three can be used without departing from the spirit of the present invention. The plunger seats are formed in a rim 54 supported for rotational movement by the housing as will be more fully described hereinafter. As shown in FIGS. 1 and 2, the shank ends of plungers 52 project from the opposite side of the cam plate where they engage a pressure plate 55. The plungers are urged into engagement with seats 53 by a series of springs 56 each seated in a socket 57 formed in end plate 17. It is preferred to physically separate the plungers from the springs which force the plungers against the seat surfaces. This assures that only the plungers and not the cam plate are subjected to a thrust force.

The maximum torque which can be transmitted by the engagement between rollers and the conjugate cam surfaces and/or rollers 30 and wedges 23 is established by the selection of the spring force which holds the plungers in the conical seats 53. When a torque occurs which is lower than the preselected maximum torque, the plungers remain seated in the conical seats keeping the cam plate retained in a fixed stationary position whereby its conjugate cam surfaces control rotation of carrier 33 which, in turn, transmits rotation to the output shaft by the engagement of rollers 30 with wedge surfaces 24.

When a torque occurs which is greater than the preselected maximum torque, the plungers are displaced from the conical seats releasing the cam plate from a fixed stationary position. The output shaft is brought to a stopped condition by the overload. The rotation of carrier 33 is now controlled by wedges 23 of the output shaft through the engagement of rollers 30 and wedges 23 as the input shaft's rotation continues to cause axis 36 to orbit about axis 18 which, in turn, now causes rotation of the cam plate 42 through the engagement of rollers 40 and 46 on cam surfaces 101 and 102 (FIGS. 7 and 8) on the speed reducer and cam surfaces 44 and 45 on the indexer. When the plungers 52 are unseated, a lock pin 58 is urged into a gap between the cam plate and the pressure plate 55 because the latter is displaced by the compression of springs 57. Pin 58 is biased by a spring 59 to assure movement and maintain its displacement into the gap between the cam plate and the pressure plate. A microswitch or the like, not shown, can be mechanically connected to the plunger 58 to provide a signal indicating that a torque overload has occurred.

The drive unit of the present invention preferably further includes an arrangement of parts to vary the phase relation between the input shaft and output shaft. The rim 54 has gear teeth 61 formed about its outer annular surface to mesh with a worm pinion 62 which is supported for rotation about an axis which is perpendicular to axis 18. As shown in FIG. 5, the pinion includes an arbor shaft 63 carried by bearings 64 at its opposite end portions within a bored opening in the housing. An end cap 65 forms an enclosure at one end of the bored opening and a seal 66 engaging with a journal on the pinion 62 is supported by a ring 67. A squared end on a portion of the worm pinion 62 projecting from the housing is used for delivery of torque thereto by a wrench or other power unit such as a motor which can be remotely controlled. Rotation of the worm pinion brings about a rotation of rim 54 within the housing. This rotary movement moves the cam plate relative to the housing which brings about a repositioning of the cam surfaces and, in turn, the phase relation between the input and output shafts.

In FIGS. 7 and 8, the parts which are similar to the parts in FIGS. 1–6 are designated with corresponding reference numerals but have the suffix "a". The drive unit of the present invention is shown in a modified form in FIGS. 7 and 8 and provides zero backlash in the drive train as described hereinbefore which provides a reduced output speed as compared with the speed of the input shaft. The cam plate 42a is provided with two spaced-apart conjugate cam surfaces 101 and 102 but does not include a cam dwell surface corresponding to surface 41 in FIGS. 1–6. Rollers 40a on arbor shaft 32a engage with cam surface 102 while rollers 46a are mounted by bearings on arbor shafts to the carrier 33a. There are two rollers 46a which can engage with cam surface 101 and two rollers 40a which can engage with cam surface 102. The conjugate cam surfaces are developed to provide a speed-reducing function in the drive unit of the present invention. The cam surfaces 101 and 102 control orbiting of the rollers 46a and 40a about axis 36a as the carrier 33a orbits about axis 18a. The ratio of these two orbits describes the speed-reducing function. The particular cam surfaces shown in FIG. 7 cause the rollers 40a to complete one orbit about axis 36a while at the same time the carrier 33a completes one orbit about axis 18a whereby there is a 180° of revolution by the output shaft. Cam surfaces can be generated to cause other than one orbit by a roller 40a per orbit by the carrier about axis 18a to thereby produce a particular desired output rotation by the output shaft. The conjugate cam surfaces can be generated to produce constant velocity, intermittent or varying velocities of motion by the output shaft.

Although the invention has been shown in connection with certain specific embodiments, it will be readily apparent to those skilled in the art that various changes in form and arrangement of parts may be made to suit requirements without departing from the spirit and scope of the invention.

It is claimed:

1. A drive unit including coaxially-aligned input and output shafts supported for individual rotation about a common first axis, and a positive drive train having zero backlash for connecting said input shaft to said output shaft, said positive drive train including planetary means for revolving about said common first axis while supported for rotation about a second axis spaced from said common first axis, said planetary means including a plurality of roller members carried by supports extending radially from said second axis for rotating about one of a plurality of third axes equally spaced from said second axis, and an array of spaced-apart wedges secured for rotating said output shaft, each wedge having tapered side surfaces diverging radially of said common first axis for rolling contact with said roller members, said wedges being radially situated from said common first axis and spaced from one another to always entrap a plurality of rollers by continuous rolling contact with a plurality of the tapered side surfaces of said wedges.

2. The drive unit according to claim 1 further including cam means to control rotation of said planetary means about said second axis by said input shaft.

3. The drive unit according to claim 1 further including cam means for controlling a dwell period during a first selected arc segment of revolution of said input shaft for rendering said output shaft means stationary, said cam means controlling an indexing period during a second selected arc segment of revolution of said input shaft when said positive drive train rotates said output shaft through a selected indexing angle in the same direction of rotation as said input shaft.

4. The drive unit according to claim 1 wherein each of said roller members includes a sleeve, a support arbor, and bearing means for rotatably supporting said sleeve on said support arbor.

5. The drive unit according to claim 1 wherein said supports to carry said roller members include spoke-shaped arm members projecting radially from a hub section with a bearing surface to rotate about said second axis, said arm members each having an outer end portion to support one of said plurality of roller members.

6. The drive unit according to claim 2 or 3 further including a housing to rotatably support said cam means, and means to rotate said cam means relative to said housing for adjusting the angular phase relation therebetween.

7. The drive unit according to claim 1, 2 or 3 wherein said input shaft includes torque-receiving and delivering members, and wherein said drive unit includes means for limiting the delivery of torque from said torque-delivering member to said torque-receiving member.

8. The drive unit according to claim 1 wherein said input shaft includes torque-receiving and delivering members, said torque-delivering member having a plurality of plunger sockets generally parallel with and radially dispersed about said common first axis, a plurality of plungers each slideable lengthwise in one of said plunger sockets such that a conical end face on each plunger projects from one side of said socket while a shank portion of the plunger projects from the opposite side of the socket, said torque-receiving member having a plurality of plunger seats each aligned to engage with the conical end of one of said plungers, a pressure plate for engaging with shank portions of said plungers projecting from said plunger sockets, and spring means to urge said pressure plate against said drive plungers for establishing a torque-limiting force between the conical ends of the plungers and said seats.

9. A drive unit comprising coaxially-aligned input and output shafts, a housing to rotatably support said shafts for rotation about a common first axis, an arbor having a second axis supported by said input shaft for revolving about said common first axis, a carrier supported by said arbor to rotate about said second axis, first, second and third sets of rollers rotatably supported by said carrier, the rollers of each set being rotatably about roller axes spaced from said second axis, cam means supported by said housing for engagement by said second and third sets of rollers to control rotation of said output shaft, and an array of spaced-apart wedges supported to drive said output shaft by continuous rolling contact with a plurality of the rollers of said first set of rollers, each of said wedges having tapered side surfaces diverging radially of said common first axis for said continuous rolling contact, said wedges being radially situated from said common first axis and spaced from one another to always entrap a plurality of rollers of said first set of rollers with a plurality of said wedges by said continuous rolling contact.

10. The drive unit according to claim 9 wherein said cam means includes a cam plate having three spaced-apart cam surfaces supported by said housing, each cam surface being engaged by different ones of said first, second and third sets of rollers.

11. The drive unit according to claim 9 further comprising torque-limiting means for coupling said cam means to said housing.

12. The drive unit according to claim 9 further including means to rotate said cam means relative to said housing for adjusting the angular phase relation therebetween.

13. The drive unit according to claim 9 wherein said cam means includes a plurality of plunger sockets generally parallel with and radially dispersed about said common first axis, a plurality of plungers each slideable lengthwise in one of said plunger sockets such that a conical end face on each plunger projects from one side of said socket while a shank portion of the plunger projects from the opposite side of the socket, said drive unit further including means having a plurality of plunger seats for support by said housing, each of said plunger seats being aligned to engage with the conical end faces of said plungers projecting from said plunger sockets, and spring means to urge said drive plungers for imposing a torque-limiting force between the conical ends of the plungers and said seats.

14. The drive unit according to claim 13 further including a first gear supported by said housing, and a second gear coupled to said means having a plurality of plunger seats, said first gear meshing with said second gear for adjusting the angular phase relation between said cam means and said housing.

* * * * *